United States Patent [19]

McCormick et al.

[11] Patent Number: 4,649,183

[45] Date of Patent: * Mar. 10, 1987

[54] CALCIUM-TOLERANT N-SUBSTITUTED ACRYLAMIDES AS THICKENERS FOR AQUEOUS SYSTEMS

[75] Inventors: Charles L. McCormick; Kenneth P. Blackmon, both of Hattiesburg, Miss.

[73] Assignee: University of Southern Mississippi, Hattiesburg, Miss.

[*] Notice: The portion of the term of this patent subsequent to Apr. 22, 2003 has been disclaimed.

[21] Appl. No.: 807,405

[22] Filed: Dec. 10, 1985

Related U.S. Application Data

[63] Continuation-in-part of Ser. No. 743,857, Jun. 12, 1985, Pat. No. 4,584,358.

[51] Int. Cl.[4] ............................................. C08F 120/58
[52] U.S. Cl. ................................... 526/240; 252/8.554
[58] Field of Search ................................ 526/240, 304

[56] References Cited

U.S. PATENT DOCUMENTS 4,438,246  3/1984  Bush ..................................... 526/304

OTHER PUBLICATIONS

J. Polymer Science, vol. 10, pp. 3311–3315, 1972.

Primary Examiner—Paul R. Michl
Attorney, Agent, or Firm—J. Edward Hess; Donald R. Johnson; Stanford M. Back

[57] ABSTRACT

A water-soluble, charged, random copolymer of acrylamide and an alkali metal salt of an acrylamido-alkanoic acid such as alkali metal 3-acrylamido-3-methylbutanoate, having an average molecular weight of greater than about 50,000, has been found to maintain unusually stable and effective viscosities in the presence of salts such as NaCl and $CaCl_2$ when added to water in minor amounts, thus making it a highly effective mobility control agent for secondary and tertiary oil recovery methods. Also within the scope of the invention are the acid form of the polymer, as well as terpolymers which additionally contain olefinically unsaturated monomers such as acrylic acid or sodium acrylate.

35 Claims, No Drawings

CALCIUM-TOLERANT N-SUBSTITUTED ACRYLAMIDES AS THICKENERS FOR AQUEOUS SYSTEMS

This invention was made with Government support under Grant DE-AS19-80-BC-10321 awarded by the Department of Energy. The Government has certain rights in this invention.

CROSS-REFERENCE TO RELATED CASES

This application is a continuation-in-part of Ser. No. 743,857, filed June 12, 1985, now U.S. Pat. No. 4,584,358.

BACKGROUND OF THE INVENTION

1. Field of the Invention

This invention relates to novel charged, random copolymers of acrylamide and acrylamido-substituted alkanoic acids or alkali metal salts thereof, such as 3-acrylamido-3-methylbutanoic acid or its sodium salt, as well as certain defined terpolymers thereof. More particularly, this invention relates to improved water flooding techniques for recovering petroleum from subterranean deposits which comprises adding minor amounts of the water soluble charged, random copolymers or terpolymers to the water flood as a mobility control agent.

2. Description of the Prior Art

Water-flooding as a method for secondary and tertiary recovery of oil is well-known in the art as a means for removing additional petroleum deposits from wells which are no longer pumping oil by routine methods. This method comprises injecting water into outlying wells under pressure and recovering oil from a central well, which oil is forced out of petroleum-bearing deposits by the water.

In the past, it has been discovered that this method is rendered more effective by the addition of various additives to the water, as for example, various surfactants and the like, but more particularly, materials which help control the mobility of the water through the rock strata, in order that it proceeds uniformly and does not pass solely through the more porous areas while by-passing the less porous rock. Thus, it is conventional to add thickening agents which increase the viscosity of the aqueous medium in order to overcome this problem. Frequently, this is done using aqueous media in various sequences, each containing different formulations of additives which enhance the desired secondary recovery and the sweep efficiency of the flooding medium.

In order to obtain mobility control in a flood, the displacing phase should have a mobility equal to or lower than the mobility of the oil. The addition of certain water-soluble polymers increases the viscosity of the water phase, and may in some instances reduce the permeability of the porous rock to water. In a heterogeneous reservoir of various porosities and fracture zones, the resistance to water flow can be significantly increased, the degree of fingering reduced, and a more uniform fluid front developed as the displacing phase moves through the petroleumbearing porous rock.

The complex physical and chemical interactions that polymer solutions encounter in the field are extremely demanding. The polymer must perform at relatively high temperatures for long periods of time under various conditions of pH, ionic strength (with various ion types), pressure, flow rate, and substrate heterogeneity. The polymer must resist shear degradation and must not absorb too strongly to the rock surface. (Preferential temporary absorption in larger pores in some instances could be beneficial for mobility control.) Multivalent cations present in the aqueous solution can lead to interactions of the charged polymers causing cross-linking, gel formation, precipitation, and pore clogging. The variety of pore sizes in reservoir rock can cause a chromatographic effect on the macromolecules. The larger molecules are excluded from smaller pores and therefore by-pass them in route to larger pores. Larger molecules thus tend to move ahead of smaller ones, and this occurs increasingly with longer distances. Polymer slug dispersion occurs thus resulting in loss of mobility control. Additionally, oil entrapped in small pores may be completely by-passed. (This portion of the rocks is referred to as "excluded" pore volume or "inaccessible" pore volume.)

Amongst the materials which have been added as viscosity-controlling agents for the aqueous medium, water soluble polymers have been preferred, including such materials as polyacrylamides, sulfonated polystyrenes, hydrolyzed polyacrylamides, copolymers of acrylamide with substituted acrylamides such as N-sulfomethyl acrylamide or 2-acrylamido-2-methylpropanesulfonate or the like. See, for example, U.S. Pat. Nos. 3,039,520; 3,679,000; or 3,804,173 which teach various polyacrylamides or copolymers of acrylamide and acrylamide derivatives as viscosity-controlling agents in oil recovery techniques. See also, U.S. Pat. No. 4,395,524 which teaches like copolymers for other industrial uses, as does Brit. Pat. No. 1,467,744, involving unsaturated cross-linked polyester polymers.

While many of these polymers have been found to be generally suitable as mobility agents, nevertheless many of them, amongst other concerns, have been found to be adversely affected by the presence of salts such as NaCl or $CaCl_2$ which are frequently found in aqueous media used in water-flooding techniques. That is to say, it has been found that the viscosity of many water-soluble polymers, while effective for mobility control purposes in the absence of such salts, is substantially reduced in their presence. This is particularly so at the elevated temperatures found in many wells.

The prior art also teaches the use of acrylamide copolymers and the like which contain charged groups such as carboxylate groups in the polymer structure. See, for example, U.S. Pat. No. 3,679,000. The presence of such groups is desirable in theory because they should help minimize the adsorption of the polymer on the surface of the rock strata, thus avoiding depletion of the polymer in the aqueous medium and possible plugging of the formation. In practice, however, such charged polymers are very sensitive to salts in the aqueous media, particularly polyvalent salts containing divalent ions such as $Ca^{++}$ and the like, which reduce the viscosity of the polymer solution significantly. The polymers of the present invention, however, which in their salt form also contain carboxylate groups, surprisingly maintain their desired viscosity in the presence of brines containing polyvalent, and particularly divalent, salts, while retaining the desirable characteristic of minimizing adsorption on the rock.

Therefore, it is an object of this invention to provide water-soluble, charged polymers as mobility control agents, i.e., as water thickeners for use in secondary and tertiary oil recovery techniques, which will maintain their desired viscosity in the presence of salts, particularly polyvalent salts, and at elevated temperatures, when added to the aqueous flooding medium in low concentrations.

It is a further object of this invention to provide an improved method for secondary and tertiary oil recovery by the use of said polymers.

These and other objects of this invention will appear from the following description.

SUMMARY OF THE INVENTION

In accordance with the present invention, it has now been found that water-soluble, charged polymers which retain their viscosity in the presence of high concentrations of salts, particularly polyvalent salts, and elevated temperatures found in secondary and tertiary oil recovery techniques may be obtained by copolymerizing acrylamide and an alkali metal salt of an acrylamido-substituted alkanoic acid such as 3-acrylamido-3-methylbutanoic acid sodium salts to form the alkali metal salt of the copolymer. As a result of these unexpected properties, when these polymers, in their water-soluble salt form, are added in low concentrations to an aqueous flood medium containing salts, particularly polyvalent salts, a highly effective recovery of secondary and tertiary oil from subterranean deposits can be achieved without the attendant loss of polymer viscosity due to the presence of salts in the aqueous media, or loss of the polymer by adsorption on the petroleum-bearing strata. The addition of other monomers to form terpolymers of the above monomers is also contemplated herein, as described below. This invention also contemplates the preparation of the corresponding acid form of the polymer, and its conversion to the alkali metal salts thereof.

Thus, the copolymers or terpolymers of this invention may be defined as random polymers of monomers comprising, by mole percent:

(a) at least about 1 percent, up to about 99 percent of acrylamide;

(b) at least about 1 percent, up to about 99 percent of an acrylamido-substituted alkanoic acid or alkali metal salt thereof; and (c) 0 to about 30 percent of one or more copolymerizable olefinically unsaturated monomers having at least one polymerizable ethylenic double bond, in which the average molecular weight of the polymer is at least about 50,000 up to as much as 50,000,000, and preferably from about 1,000,000 to about 20,000,000. Stated in another manner the copolymers or terpolymers of the invention contain moities which comprise, by mole percent, (a), (b) and (c) as specified above. The resulting polymers, in their alkali metal salt form, comprise the preferred water-soluble polymers used in the oil-recovery process of this invention. The corresponding acid form of the polymer, while less water soluble, particularly at low pH's, may readily be converted to the more water-soluble salt form, as described below.

The present invention thus encompasses both copolymers and terpolymers in their acid or salt form which are obtained by polymerizing the aforedescribed monomers, as well as the use of the alkali metal salt form in sweeping petroleum from underground formations by their addition to aqueous compositions in order to make them sufficiently viscous for the purpose intended, notwithstanding the presence of salts which would normally be deleterious to polymers of the prior art.

In the above description it will be understood that by the term "charged" is meant those polymers containing carboxylate groups which are incorporated in the polymer and which yield anionic polyelectrolytes upon solution in water.

Also, by the term "random copolymer" is meant one in which the comonomers are substantially random in their distribution throughout the polymer chain, but which may still contain small blocks of homopolymers in the polymer structure in amounts which do not adversely or substantially affect the unique properties of the copolymers. For example, it has been found that the reactivity ratios of acrylamide and sodium 3-acrylamido-3-methylbutanoate acid of this invention are substantially the same, and thus the distribution of the monomers would be expected to be substantially random.

DESCRIPTION OF THE MONOMERS

As stated above, the novel polymers of the present invention are random copolymers obtained by polymerizing acrylamide and an acrylamido-substituted alkanoic acid or alkali metal salt thereof, preferably the sodium salt, although other alkali metal salts such as ammonium, lithium, or potassium salts may be employed instead.

Thus, the polymers of this invention are obtained by polymerizing acrylamide and an acrylamido-substituted alkanoic acid, or alkali metal salt thereof, wherein the acrylamido moiety of the alkanoic acid monomer may be substituted at the 2-position with alkyl groups, preferably with lower alkyl groups having from 1 to about 4 carbon atoms; and wherein the alkanoic acid moiety, which may be straight or branched chain, and preferably is branched, has from about 3 to 8 carbon atoms, preferably 4 to 7, and more preferably 5 or 6 carbon atoms.

Illustrations of acrylamido-substituted alkanoic acid monomers which may be employed in forming the polymers of this invention include such monomers as:
3-acrylamido-2-methylbutanoic acid;
3-acrylamido-3-methylpentanoic acid;
2-acrylamido-2-methyl-3,3-dimethyl butanoic acid;
3-acrylamido-hexanoic acid;
3-methacrylamido-3-methylbutanoic acid;
3-acrylamido-3-methylbutanoic acid;
4-acrylamido-3,3-dimethyl-hexanoic acid;
3-acrylamido-octanoic acid;
and the like. Of these, the 3-acrylamido-substituted acids having alkyl groups on the 3-carbon atom, preferably the 3-dialkyl-substituted acids such as 3-acrylamido-3-methylbutanoic acid, and alkali metal salts thereof are the most preferred of all the monomers.

Optionally, for purposes of cost effectiveness, and/or to better match the physical characteristics of the reservoir, small amounts of one or more other olefinically unsaturated monomers, having at least one polymerizable ethylenic double bond may be introduced into the copolymer, i.e., monomers which will readily copolymerize with the principal monomers, acrylamide and an acrylamido-alkanoic acid or salt, but which do not otherwise materially adversely affect the properties of this copolymer for use in its intended application, in amounts of up to about 30 percent. Illustrative of, but not intended to be all-inclusive, are acrylic acid or its alkali metal salts, N-substituted acrylamides, and other materials which may be copolymerized with other vinyl monomers, including ionic and nonionic acrylamide copolymers, such as are taught, for example, in U.S. Pat. Nos. 4,395,524 and 4,192,784, the contents of which are incorporated herein by reference. Other monomers known in the art which do not materially adversely affect the properties of the copolymers of the invention may likewise be employed, including both hydrophilic and, to a lesser extent, hydrophobic monomers.

As stated above, there may optionally be included in the polymer up to 30 mole percent of acrylic acid or its alkali metal salt. The acrylic acid or its salt can be added separately, but under some conditions it will form in situ. Thus, for example, while the pH of the reaction medium during polymerization should desirably be in the range of about 7 to 10, and preferably 8 to 9, for reasons discussed below it will be understood that if lower pH's are employed, certain amounts of acrylic acid may form in situ from the acrylamide, whereas, at higher pH's, e.g., in excess of about 10, small amounts of the acrylamide may be converted to the corresponding alkali metal acrylate. Again, it will be understood that the amount of acrylic acid or corresponding acrylate which may be added or formed in situ should be limited to those amounts which will not materially interfere with the properties of this novel polymer so as to preclude its use in the intended application.

The acrylamido-alkanoic acid monomers may be prepared in a number of ways known to those skilled in the art. For example, a Ritter condensation of acrylonitrile with the unsaturated acid corresponding to the desired alkanoic acid, or optionally, the haloform oxidation of the ketone corresponding to the desired acid will both provide the acrylamido-substituted alkanoic acid monomers employed in this process. Alternatively, the alkali metal 3-acrylamido-3-methylbutanoate employed as the preferred comonomer herein is a known compound which may be prepared as described in Hoke et al., *J. Poly. Sci.*, Vol. 10, p. 3311-3315 (1972). Briefly, this process involves the reaction of 3,3-dimethylacrylic acid with acrylonitrile in the presence of $H_2SO_4$ and an inhibitor such as 4,4'-methylene-bis-(2,6-di-tert-butylphenol) to form 3-acrylamido-3-methylbutanoic acid, from which the corresponding alkali metal salt may be formed. If 2-methacrylonitrile is substituted for acrylonitrile, there is obtained the corresponding 3-methacrylamido-3-methylbutanoic acid which may be employed as a monomer in the polymers of this invention. Other like alkyl-substituted monomers may also be routinely prepared by those skilled in the art, following the teachings of the *J. Poly. Sci.* article.

PREPARATION OF THE POLYMERS

In the following description, for sake of clarity, the polymerization process will be described with particular respect to one preferred acid monomer, namely, 3-acrylamido-3-methylbutanoic acid monomer, most desirably in its sodium salt form (hereinafter "NaAMB"). It will be understood that this process applies also to other acrylamido-alkanoic acid monomers; however, those skilled in the art will appreciate that differences in the properties of certain of the acids may require routine process modifications known in the polymerization art in order to obtain a polymer suitable for its intended purpose.

The novel water soluble copolymer or terpolymer salts of this invention may conveniently be prepared by at least two different methods: (1) by polymerization of acrylamide with the alkanoic acid itself to form the corresponding acid polymer, which may then be converted to its alkali metal salt, or more preferably, (2) by polymerization of acrylamide with an alkanoic acid alkali metal salt, which may be formed in situ from the acid monomer in the reaction mixture by the added presence of an alkaline reagent. The former method is less desirable in that the acid monomer is only partially soluble in water, and, at low pH's sufficient to keep the polymer in its acid form, e.g., at about pH 2, or lower, it has been found that the resulting copolymer precipitates out in water. A separate step is then required to convert it to its water-soluble salt form. By carrying out the reaction in an aqueous medium at pH's of a least about 7 and above, the alkanoic acid monomer is substantially converted in situ to its salt form, thereby resulting in the direct production of the water-soluble salt form of the copolymer. Optionally, in the latter case, if the free acid form of the copolymer is desired, it can be obtained by known neutralization methods using various acids or acidic reagents.

From the foregoing it will be seen that depending upon the pH of the reaction medium the polymer will generally be in either its acid or salt form. However, it will be understood that at intermediate pH's a partially ionized polymer is obtained, i.e., one with, in varying degrees, both non-ionized carboxyl groups, i.e., in the acid form, and ionized groups, i.e., in their salt form. Thus, throughout the following description, any reference to the acid and/or salt form of the polymers, as defined herein, is intended to include said partially ionized forms thereof as well.

Preferably the process is carried out by first contacting the acrylamido-alkanoic acid such as 3-acrylamido-3-methylbutanoic acid in an aqueous solution with a sufficient amount of an alkali metal reagent, preferably NaOH, to form the corresponding water soluble salt, and thereafter polymerizing said salt of said acid with acrylamide in the presence of an initiator such as potassium persulfate or the like, preferably in a substantially oxygen-free atmosphere. Other monomers, as described above, may likewise be introduced into this reaction in a known manner, to form terpolymers.

During the polymerization the pH should, for the reasons stated above, preferably be maintained at from about 7 to 10, most preferably about 8 to 9, in order to ensure that the monomer, e.g., the 3-acrylamido-3-methylbutanoic acid, is maintained in its alkali metal salt form in order to keep it highly solubilized. This may readily be accomplished by the further addition of small amounts of NaOH or like reagents. In other solvents, however, this may not be necessary, in which case the free acid monomer could more readily be employed.

The temperature at which the polymerization should be carried out is not critical but should generally be from about 20° to 70° C., preferably about 30° to 50° C., at which temperature the reaction should be carried out for about 1 to 16 hours, and preferably at least about 10 hours, or until the reactants are substantially used up. Thus, as shown in Table I, while modest conversions start to take place after about 60-80 minutes, longer reaction times up to several hours result in significantly higher conversions.

The mole ratio of initiator to total monomers, using for example the preferred potassium persulfate, is not critical, but is desirably in the range of from about 1:100 to 1:10,000, and preferably 1:200 to 1:2000, although this amount may be adjusted routinely depending upon other reaction conditions, the presence of termonomers, and the like.

The feed ratio of acrylamide to the acrylamido-alkanoic acid or salt, based on mole percent, may vary greatly, ranging from about 1 to 99 percent acrylamide, and from about 1 to 99 percent, and preferably from about 5 to 50 percent, of said acid or salt. In particular, copolymers containing about 30-97 percent acrylamide, preferably 50-95 percent, most preferably 85-95 percent, and about 3-70 percent of said alkanoic acid or salt, preferably 5-50 percent, most preferably 5-15 percent, maintain a high viscosity in the presence of NaCl or $CaCl_2$. Moreover, these preferred copolymers maintain good viscosities, as will also be shown below, under a wide range of temperatures up to at least about 100° C.

As previously described, it has been found, in a preferred embodiment, that the reactivity of the acrylamide and 3-acrylamido-3-methylbutanoic acid comonomers is virtually the same, and therefore the copolymer can be expected to have a substantially random structure. By the same token, because of this equality in reactivity ratios, the proportions of each monomer can be carefully controlled in direct proportion to the mole ratio of the feed. Thus, for example, if a mole ratio of 5 percent NaAMB and 95 percent acrylamide is desired, the corresponding feed ratios should be employed, subject to only minor adjustments which will be understood by those skilled in the art. When up to about 30 percent of additional monomers are introduced, as defined above, those skilled in the art will recognize that further routine adjustments to the feed rate will also be necessary, depending upon the reactivity of the monomer, and the desired mole percent of additional monomer in the terpolymer.

The preparation of the copolymer of this invention will now be illustrated by, but is not intended to be limited to, the following examples, in which a series of fourteen runs were carried out, using various mole proportions of acrylamide and NaAMB, and for different periods of time. A fifteenth run using NaAMB alone was also carried out for comparative purposes, while Example 16 illustrates the preparation of various terpolymers.

The results of these runs, and an analysis of the mole percent of acrylamide and NaAMB in the copolymer, are reported in Table I below.

EXAMPLES 1-15

In the first fourteen of the following examples, the copolymerization of acrylamide with NaAMB was conducted at 30° C. in aqueous solution using potassium persulfate as the initiator. The pH value of the solution was adjusted to 9.0±0.1 by addition of NaOH. Thus, in each reaction of the copolymerization series, a specified amount of NaAMB was partially dissolved in distilled water followed by the addition of an equimolar amount of NaOH. A specified amount of acrylamide dissolved in distilled water was then added to this solution, and the pH of the entire mixture was adjusted to 9.0 by dropwise addition of 0.5 M NaOH. The pH adjustment was performed to ensure that all of the carboxylated monomer was in the sodium salt form. Each reaction mixture was then deaerated with oxygen-free nitrogen for 20 min. while allowing the reaction temperature of 30° C. to be obtained. The designated quantity of potassium persulfate initiator, dissolved in water, was injected into the reaction vessel. The total monomer concentrations in each reaction were held constant at 0.46 M. After designated reaction intervals, the resulting polymer solution was diluted with water and the polymer precipitated by pouring the solution into acetone. The copolymers were further purified by redissolving them in water, and reprecipitating them in acetone followed by freeze-drying and then vacuum drying the polymers for 2 days. Conversions were determined gravimetrically. Table I lists reaction parameters for this copolymerization series, as well as for the homopolymerization of NaAMB (Example 15).

The mole percent of acrylamide ($M_1$) and NaAMB ($M_2$) in the copolymer was measured by C-13 NMR and by elemental analysis. The elemental analysis results are also shown in Table I. The weight percent conversion is calculated based on the formula $$\text{Conversion} = \frac{\text{weight of copolymer produced}}{\text{weight of NaAMB starting material plus weight of acrylamide starting material}} \times 100$$

TABLE I

Reaction Parameters For The Copolymerization of Acrylamide ($M_1$) with Sodium 3-Acrylamido-3-Methylbutanoate ($M_2$), and Homopolymerization of NaAMB

| Example | Mole Ratio $\frac{[K_2S_2O_8]}{[M_1]+[M_2]}$ | Feed Ratio $M_1:M_2$ (Mol %) | Reaction Time (min) | Conversion (Wt %) | Composition (Mol %)[a] AM | NaAMB |
|---|---|---|---|---|---|---|
| 1 | 1:1000 | 95:5 | 60 | 2.6 | 94.01 | 5.99 |
| 2 | 1:1000 | 95:5 | 300 | 40.4 | 93.96 | 6.04 |
| 3 | 1:1000 | 90:10 | 80 | 7.6 | 91.96 | 8.04 |
| 4 | 1:1000 | 90:10 | 300 | 91.63 8.37 | | |
| 5 | 1:1000 | 75:25 | 80 | 6.3 | 79.73 | 20.27 |
| 6 | 1:1000 | 75:25 | 300 | 49.2 | 79.95 | 20.05 |
| 7 | 1:1000 | 67:33 | 60 | 6.1 | 73.01 | 26.99 |
| 8 | 1:1000 | 67:33 | 300 | 48.6 | 70.81 | 29.19 |
| 9 | 1:1000 | 60:40 | 80 | 3.1 | 68.77 | 31.23 |
| 10 | 1:1000 | 60:40 | 300 | 42.3 | 68.59 | 31.41 |
| 11 | 1:1000 | 40:60 | 80 | 3.5 | 51.61 | 48.39 |
| 12 | 1:1000 | 40:60 | 300 | 37.0 | 50.23 | 49.77 |
| 13 | 1:1000 | 25:75 | 80 | 4.2 | 36.89 | 63.11 |
| 14 | 1:1000 | 25:75 | 300 | 34.1 | 36.42 | 63.58 |
| 15 | 1:1000 | — | 270 | 7.2 | — | 100 |

[a]from elemental analysis.

EXAMPLE 16

In a further embodiment, a terpolymer comprising acrylamide, NaAMB, and sodium acrylate was prepared as follows:

To a solution of 0.5 g NaOH pellets in 20 ml water were added stepwise 600 mg AMB (3-acrylamido-3-methylbutanoic acid), 500 mg acrylic acid, 1.75 g acrylamide, 4 ml 0.5N NaOH, 2 ml additional water, and 3.5 mg potassium persulfate. The solution was bubbled with $N_2$ and maintained under an atmosphere of $N_2$ at 30° C. for 15.5 hrs.

The product was analyzed and found to have an acrylamide:AMB:acrylic acid mole ratio of 70:10:20 (in which the AMB was essentially in its NaAMB form, and the acrylic acid was essentially in its sodium acrylate form), and a molecular weight of $2.97 \times 10^6$ by chromatography. Conversion of monomer to polymer was determined to be virtually 100% based on liquid chromatography.

In accordance with the foregoing procedure but substituting NaAMB for AMB in the feed, and substantially reducing the NaOH, there is obtained the corresponding acrylamide:NaAMB:acrylic acid terpolymer.

In accordance with the first procedure above, but substituting sodium acrylate for acrylic acid, and proportionately reducing the amount of NaOH to what is necessary to solubilize the amount of AMB present, there is obtained the corresponding acrylamide:-NaAMB: sodium acrylate terpolymer.

PROPERTIES OF THE COPOLYMER

As described above, the copolymer of this invention is particularly advantageous in aqueous environments containing high concentrations of salts such as NaCl. A series of studies was carried out to demonstrate the rheological behavior of certain of the copolymers of Examples 1-14.

Thus, the dilute-solution behavior of AM-NaAMB copolymers was studied to determine the effects of added salt, pH, temperature, and composition on the viscosities of these polymers. The results of the studies are shown in the Examples 17-72 below. In Examples 17-41 (Table II), although almost all of the zero-shear intrinsic viscosities decrease with increasing salt concentration, the decreases are much smaller than expected. The copolymer with about 8 mol percent NaAMB shows the highest degree of NaCl salt tolerance, i.e., maintains its viscosity with an increase in salt concentration, as does, to a slighly lesser degree, the copolymer with about 31 mol percent NaAMB. Thus, as stated above, copolymers containing 5-50 mol percent NaAMB, and particularly those having 5-15 percent, are especially preferred for purposes of this invention.

As seen in Examples 42-53 (Table III), the viscosities decreased with increasing temperature, though reasonable temperature stability was observed. Finally, the polymers were affected by pH, with the highest viscosities observed at a pH greater than 8 (Table IV).

In addition, turbidimetry studies were also carried out to demonstrate the effect of a divalent electrolyte such as $CaCl_2$ on the novel copolymers (Table V).

That is to say, many carboxylated copolymers will precipitate from aqueous, divalent electrolyte-containing solutions as temperatures increase. Examples 69-71 in Table V below show the phase behavior of the prior art polymers at various temperatures in the presence of $Ca^{++}$, namely, a hydrolyzed polyacrylamide sample (degree of hydrolysis 40 mol %), and a copolymer of acrylamide with sodium acrylate (carboxylate content 30-40 mol %). It will be seen that the utility of these polymers is severely limited due to the fact that they precipitate at relatively low temperatures in the presence of $Ca^{++}$. However, most unexpectedly, as shown in Example 72, the copolymers of AM with NaAMB in concentrations of at least 1-5 g/l do not precipitate from solution even at temperatures up to at least 100° C. and at $Ca^{++}$ concentrations up to at least 7 wt %. Example 71 shows that the prior art homopolymer of sodium 3-acrylamido-3-methylbutanoate does precipitate, although at somewhat higher temperatures. Thus, the stability of the AM-NaAMB copolymers in the presence of $Ca^{++}$ is obviously superior to other carboxylated systems.

From the foregoing, and as will be seen in the following examples, it can be concluded that, in contrast to conventional acrylamide mobility control agents, the copolymers of AM with NaAMB do exhibit unexpectedly high viscosities in the presence of salt, and, as aforestated, two copolymers in particular (8 mol % NaAMB, and 31 mol % NaAMB) show very high viscosities. Furthermore, the copolymers of AM with NaAMB show good temperature stability in the presence of divalent ions. This combination of properties is thus especially favorable for a polymer being used as a mobility control agent in enhanced oil recovery when using brines.

EXAMPLES 17-41

The following examples were performed to show the effect of NaCl solutions on the intrinsic viscosity of certain of the copolymers of this invention. The results are shown in Table II below, of which Examples 39 to 41 are comparative examples showing the properties of certain prior art polymers.

In carrying out these tests, the required amounts of NaCl were dissolved in deionized water. Polymer stock solutions were then prepared in accordance with this invention having concentrations of 0.15 g/dl (1500 ppm). The resulting polymer solutions exhibited basic pH's (8.5-9). The viscosity measurements were performed with a Cannon-Ubbelohde four-bulb shear dilution viscometer (size 100) in a constant temperature bath at 30.0°±0.1° C. Intrinsic viscosities of the polymers were obtained by use of the Huggins equation to obtain zero-shear intrinsic viscosities. The Huggins equation is taught in *Physical Chemistry of Macromolecules* by C. Tanford, John Wiley & Sons, Inc., N.Y., 1961.

TABLE II

| Example | Mol % of AM:NaAMB Copolymer | NaCl Conc. (Wt %) | Zero-Shear Intrinsic Viscosity (dl/g) |
|---|---|---|---|
| 17 | 93.96:6.04 | 1.50 | 28.1 |
| 18 | 91.63:8.37 | 0.25 | 52.1 |
| 19 | 91.63:8.37 | 0.50 | 43.5 |
| 20 | 91.63:8.37 | 1.50 | 42.1 |
| 21 | 91.63:8.37 | 3.00 | 39.5 |
| 22 | 79.95:20.05 | 0.25 | 39.0 |
| 23 | 79.95:20.05 | 0.50 | 28.3 |
| 24 | 79.95:20.05 | 1.50 | 18.9 |
| 25 | 79.95:20.05 | 3.00 | 16.7 |
| 26 | 70.81:29.19 | 1.50 | 25.8 |
| 27 | 68.59:31.41 | 0.25 | 54.9 |
| 28 | 68.59:31.41 | 0.50 | 62.6 |
| 29 | 68.59:31.41 | 1.50 | 52.7 |
| 30 | 68.59:31.41 | 3.00 | 35.4 |
| 31 | 50.23:49.77 | 0.25 | 61.9 |
| 32 | 50.23:49.77 | 0.50 | 61.6 |
| 33 | 50.23:49.77 | 1.50 | 36.2 |
| 34 | 50.23:49.77 | 3.00 | 27.9 |
| 35 | 36.42:63.58 | 0.25 | 40.7 |
| 36 | 36.42:63.58 | 0.50 | 42.1 |
| 37 | 36.42:63.58 | 1.50 | 28.3 |
| 38 | 36.42:63.58 | 3.00 | 26.8 |
| COMPARATIVE EXAMPLES | | | |
| 39 | 84.13:15.87[a] | 1.50 | 9.1 |
| 40 | 83.01:16.99[b] | 1.50 | 21.0 |
| 41 | 90.5:9.5[c] | 1.50 | 29.5 |

[a] copolymer of acrylamide with sodium acrylate (AM:NaA).
[b] partially hydrolyzed (16.99%) polyacrylamide, i.e. containing 16.99% Na acrylate (AM:NaA).
[c] copolymer of acrylamide with Na 2-acrylamido-2-methylpropanesulfonate (AM:-NaAMPS); U.S. Pat. No. 3,679,000.

In almost all cases, it will then be seen from the above results that the AM-NaAMB copolymers exhibit higher viscosities in the presence of NaCl than comparable copolymers of the prior art.

EXAMPLES 42-53

The following examples were performed to show the effect of temperature on the intrinsic viscosity of certain of the copolymers of Examples 17-38. The results are shown in Table III below, of which Examples 51 to 53 compare the results obtained from a prior art polymer.

With the aid of a constant temperature bath, copolymer viscosities were studied at 30°, 50° and 70° C. (±0.1° C.) to observe the effects of temperature on the intrinsic viscosities. The viscosity measurements were performed with a Cannon-Ubbelohde four-bulb shear dilution viscometer (size 100) in 1.50 wt % NaCl solution at a pH of 8.5-9.0, and the results calculated as discussed in Examples 17-41, above.

TABLE III

| Example | Mol % of AM:NaAMB Copolymer | Temperature (°C.) | Intrinsic Viscosity (dl/g) |
|---|---|---|---|
| 42 | 91.63:8.37 | 30.0 | 42.1 |
| 43 | 91.63:8.37 | 50.0 | 30.4 |
| 44 | 91.63:8.37 | 70.0 | 26.7 |
| 45 | 68.59:31.41 | 30.0 | 52.7 |
| 46 | 68.59:31.41 | 50.0 | 40.4 |
| 47 | 68.59:31.41 | 70.0 | 37.6 |
| 48 | 36.42:63.58 | 30.0 | 28.3 |
| 49 | 36.42:63.58 | 50.0 | 26.6 |
| 50 | 36.42:63.58 | 70.0 | 25.2 |
| COMPARATIVE EXAMPLES | | | |
| 51 | 90.5:9.5[a] | 30.0 | 29.5 |
| 52 | 90.5:9.5[a] | 50.0 | 25.1 |
| 53 | 90.5:9.5[a] | 70.0 | 22.9 |

[a]copolymer of acrylamide with Na 2-acrylamido-2-methylpropanesulfonate (AM:-NaAMPS).

From the above results it will be seen that the AM-NaAMB copolymers maintain a high viscosity under relatively high temperature conditions. These high viscosities are generally superior to those of the prior art polymer.

EXAMPLES 54-68

The following examples were performed to illustrate the effect of pH on certain of the copolymers of this invention. The results are shown in Table IV below.

Certain of the polymer solutions were used in the pH studies as in the previous examples. The intrinsic viscosities of the copolymers were obtained at pH4, pH7 and pH9 at 30.0° C.±0.1° C. in 3.0 wt % NaCl solutions. The pH adjustments were peformed by the addition of HCl or NaOH to the polymer solutions. Again, a Cannon-Ubbelohde four-bulb shear dilution viscometer (size 100) was used.

TABLE IV

| Example | Mol % of AM:NaAMB Copolymer | pH | Intrinsic Viscosity (dl/g) |
|---|---|---|---|
| 54 | 91.63:8.37 | 4 | 23.8 |
| 55 | 91.63:8.37 | 7 | 26.0 |
| 56 | 91.63:8.37 | 9 | 39.5 |
| 57 | 79.95:20.05 | 4 | 9.3 |
| 58 | 79.95:20.05 | 7 | 13.2 |
| 59 | 79.95:20.05 | 9 | 16.7 |
| 60 | 68.59:31.41 | 4 | 15.4 |
| 61 | 68.59:31.41 | 7 | 16.1 |

TABLE IV-continued

| Example | Mol % of AM:NaAMB Copolymer | pH | Intrinsic Viscosity (dl/g) |
|---|---|---|---|
| 62 | 68.59:31.41 | 9 | 35.4 |
| 63 | 50.23:49.77 | 4 | 11.1 |
| 64 | 50.23:49.77 | 7 | 11.9 |
| 65 | 50.23:49.77 | 9 | 27.9 |
| 66 | 36.42:63.58 | 4 | 5.7 |
| 67 | 36.42:63.58 | 7 | 23.4 |
| 68 | 36.42:63.58 | 9 | 26.8 |

From the above results it will be seen that the viscosity increases as pH increases. An advantage of this property is the ability to control the magnitude of the viscosity of the AM-NaAMB copolymers by adjusting the pH, which can even be done in the field.

EXAMPLES 69-72

The following examples were performed in order to show the effect of calcium ions on the polymers of this invention as compared with their effect on certain commercially available prior art polymers. The results are shown in Table V below.

The selected polymers were dissolved in deionized $H_2O$ at a concentration of 1.5 g/l. A stock solution of 10% $CaCl_2$ was made. The polymer solutions were then titrated with an aqueous $CaCl_2$ solution to achieve the required concentration of $CaCl_2$. The critical temperatures, Tc, (i.e. temperatures at which the polymer solution become turbid) were determined by the use of a phototurbidimeter consisting of a light source, a photometer, and a heat source. The polymer solutions were stirred by a magnetic stirrer, and the temperature raised at a rate of 1° C. per minute. A thermometer inserted into the polymer solution allowed the temperature to be observed. The temperature at which the % transmittance falls below 100 was taken as the onset of turbidity (Tc).

TABLE V

| | | Temperature (°C.) At Which Polymers Precipitate in Presence of $CaCl_2$ | | | | | | | | | |
|---|---|---|---|---|---|---|---|---|---|---|---|
| | | Wt % of $CaCl_2$ | | | | | | | | | |
| Ex. | Polymer | 0.25 | 0.50 | 0.75 | 1.0 | 1.25 | 1.5 | 2.0 | 2.5 | 3.0 | 7.0 |
| 69 | HPAM[a] | 60.4 | 50.0 | 43.7 | 41.0 | 42.1 | 43.9 | 49.7 | 53.6 | 58.1 | N/A |
| 70 | NaA[b] | 65.5 | 56.7 | 51.2 | 48.6 | 50.2 | 51.8 | 55.2 | 59.7 | 62.9 | N/A |
| 71 | NaAMB Homopolymer | 82.4 | 80.1 | 76.7 | 74.9 | 74.7 | 73.7 | 72.6 | 71.7 | 70.8 | 63.7 |
| 72 | NaAMB Copolymers[c] | No Precipitation Up to at least 100° C. | | | | | | | | | |

[a]HPAM = Hydrolyzed Polyacrylamide with degree of hydrolysis - 40%.
[b]NaA = Copolymers of acrylamide with 35% sodium acrylate.
[c]NaAMB Copolymers = The polymers of Examples 4, 6, 10, 12 and 14 of Table I.
N/A = Not available.

From the above results it will be seen that the AM-NaAMB copolymers do not precipitate in the presence of divalent ions ($Ca^{++}$) as a function of temperature, at least within the concentrations and temperatures given. This observation, when compared to prior art polymers, demonstrates the obvious superiority of AM-NaAMB copolymers over prior art polymers in applications involving polyvalent ionic species.

USE OF THE COPOLYMER

In carrying out the process of this invention, the copolymers of this invention are dissolved in an aqueous medium prior to injection into an input well in amounts sufficient to provide the desired viscosity. According to circumstances, the aqueous medium may be water, brine containing various salts, or, optionally, a steam flood system.

Depending upon the nature of the petroleum-bearing strata, the viscosity of the oil, the presence of salts in the aqueous medium, and the like, a polymer of the desired viscosity is then selected, preferably a polymer having a molecular weight of greater than 50,000, and more preferably from about 1,000,000 to 50,000,000. When polymers in this range are employed, it is desirable to provide concentrations of from about 100 to 2000 ppm by weight of polymer based on the weight of the aqueous medium, although this may be varied considerably depending upon the nature of the strata, the viscosity of the oil, the presence of salts, etc. The viscosity of the polymer-containing aqueous medium should be adjusted to take into account both the amount of salts present and the viscosity of the oil being displaced, since for maximum effectiveness in secondary and tertiary recovery, the viscosity of the polymer solution should match or exceed that of the oil. Each of these factors, and the selection of polymer and viscosity can best be determined routinely by known testing methods in laboratories using core samples obtained in the field, using the type of aqueous medium, i.e., brine, etc., which is to be used in the field. In any case, the polymer may be used either in the drive water or as a mobility buffer together with a micellar solution, or one of a sequence of such solutions chosen for optimum recovery of the oil.

In addition to the polymer, other known additives conventionally employed in secondary and tertiary oil recovery techniques are also contemplated as being within the scope of this invention, including, but not limited to surfactants, sequestering agents, antimicrobial agents, and the like.

The polymers, as taught above, are normally prepared in an aqueous solution beforehand and may be added as such to the aqueous medium in the field. Alternatively, the polymer may be prepared in the form of a suspension or emulsion. In yet another embodiment, the monomers may be suspended in a solution or solvent and thereafter formed in situ in the field.

EXAMPLES 73-77

The following examples illustrate the flood performance of various polymers of this invention, as compared with prior art polymers, when tested on representative core samples in the laboratory.

The behavior of aqueous solutions of selected polymers of this invention having varying composition and viscosities were tested under controlled conditions in the laboratory in which a brine solution containing 3 wt % NaCl and 0.3 wt % $Ca^{++}$ salts was flushed through Berea sandstone core samples followed by pumping selected polymer solutions through the cores. This in turn was followed by several pore volumes of the same brine solution, displacing the polymer solution. Calculations were made, as explained below, on measurements of throughput and pressure drop during each step to determine the various resistance factors set forth in Table VII below. In addition, other measurements were made to determine how much polymer was retained by the core samples, and how much passed through, as also shown in Table VII.

Tests were performed which showed the properties of these polymers as compared with those of a well-known commercial hydrolyzed polyacrylamide flood polymer (Pusher 700 TM; Dow Corp.). Thus, measurements were made of resistance factor, residual resistance, and produced polymer.

The resistance factor of a polymer is defined as the ratio of "initial permeability" to "flushed permeability" of the core sample in which a higher ratio (up to about 10) is desired to ensure that the polymer solution goes through the core, displacing liquids of lesser viscosities with little or no fingering occurring at the interface dividing the polymer solution and the displaced liquid of lesser viscosity. In these measurements "initial permeability" was calculated as the ratio of throughput to pressure drop of the hard brine solution, while the "flushed permeability" was calculated as the ratio of throughput to pressure drop of the polymer solution pumped through the core.

The residual resistance of a polymer is defined as the ratio of initial permeability to a third permeability factor determined when a volume of brine is again pumped through the core following the polymer. This latter permeability measurement is itself a ratio of throughput of brine to its steady state pressure drop, as in the instance of the first injection of brine. The residual resistance is thus a measure of the permeability reduction as influenced by injected polymer. As high a residual resistance as possible is desired.

In a further test of the efficiency of the copolymers of this invention, the percentage of produced polymer was also measured. This measurement, also shown in Table VII, represents that amount of polymer recovered in the produced water after the polymer solution was passed through the core, expressed as a percentage of the total polymer present in the injected solution. The higher percentages signify that less polymer is lost to the core as a result of absorption.

In carrying out these tests, Berea cores of relatively high air permeability, and having dimensions set forth in Table VI below, were mounted vertically so that fluids could readily be passed through the axis of the core. To prevent any loss of fluid through their sides, all cores were first potted in epoxy resin by techniques known to those skilled in the art.

The cores were first flooded by pumping through each core a 2 wt. % NaCl solution followed by three pore volumes of hard brine containing 3 wt. % NaCl and 0.3 wt. % $Ca^{++}$ ions at the rate of one pore volume per twelve hours, where the pore volumes of the cores were as indicated in Table VI below. This was followed by the injection of 1 pore volume of filtered polymer solution whose concentrations ranged between about 0.08 wt. % and 0.1 %, and then by at least 3 additional pore volumes of said hard brine. Steady-state pressure drops measured after each flooding step provided the resistance factor and residual resistance results reported in Table VII, while liquid chromatography measurements of the recovered polymer solution provided the produced polymer results.

The dimensions and properties of the core samples used in Examples 74-78 were as follows:

TABLE VI

| Core For Example: | Air Perm. (md.) | Core Properties Length (cm) | Core Dimensions Area ($cm^2$) | PV ($cm^3$) |
|---|---|---|---|---|
| 73 | 1156 | 30.4 | 10.3 | 72 |
| 74 | 1078 | 30.4 | 10.5 | 73 |
| 75 | 1134 | 30.4 | 10.6 | 79 |
| 76 | 1102 | 30.4 | 10.4 | 80 |
| 77 | 1215 | 30.4 | 10.8 | 85 |

PV = Pore volume; determined by using a 2 wt. % NaCl solution (cores were stored within this solution until used.)

TABLE VII

Summary of Polymer Flood Performance (In Hard Brine)[a]

| Example | Polymer | Injected Conc., (%) | Resistance[b] Factor | Residual Resistance | Produced Polymer, (%) |
|---|---|---|---|---|---|
| 73 | AMB-10[c] | 0.083 | 2.77 | 1.40 | 15.7 |
| 74 | AMB-20[d] | 0.095 | 5.45 | 1.97 | 43.8 |
| 75 | AMB-40[e] | 0.082 | 5.60 | 2.20 | 75.8 |
| 76 | AMB-10/AA-20[f] | 0.096 | 2.60 | 1.31 | 45.3 |
| 77 | Pusher 700[g] | 0.10 | 2.56 | 1.22 | 28.2 |

[a]3 wt % NaCl plus 0.3 wt % Ca++
[b]Based upon last one hour of injection
[c]AMB-10 = copolymer of 90 mole % acrylamide and 10 mole % of NaAMB
[d]AMB-20 = copolymer of 80 mole % acrylamide and 20 mole % of NaAMB
[e]AMB-40 = copolymer of 60 mole % acrylamide and 40 mole % of NaAMB
[f]AMB 10/AA-20 = terpolymer of 70 mole % acrylamide, 10 mole % NaAMB, and 20 mole % acrylic acid (in the sodium acrylate form)
[g]Pusher 700 ™ = commercially available copolymer of acrylamide and acrylic acid (Dow Corp.)

What we claim is:

1. A random polymer which contains moieties which comprise, by mole percent:
    (a) from about 1 to 99 percent of acrylamide;
    (b) from about 1 to 99 percent of an acrylamido-substituted alkanoic acid or alkali metal salt thereof; and
    (c) from 0 to about 30 percent of one or more copolymerizable olefinically unsaturated monomers having at least one polymerizable ethylenic double bond,
in which the polymer has an average molecular weight greater than about 50,000.

2. Polymers of claim 1 wherein the average molecular weight is from about 1,000,000 to 20,000,000.

3. Polymers of claim 1 wherein the alkanoic acid moiety of the acrylamido-substituted alkanoic acid has from about 3 to 8 carbon atoms.

4. Polymers of claim 1 wherein the alkanoic acid moiety of the acrylamido-substituted alkanoic acid has from about 4 to 7 carbon atoms.

5. Polymers of claim 1 wherein the alkanoic acid moiety of the acrylamido-substituted alkanoic acid has 5 or 6 carbon atoms.

6. Polymers of any of claims 1 to 4 or 5 wherein the acid moiety of the acrylamido-substituted alkanoic acid is a straight chain acid.

7. Polymers of any of claims 1 to 4 or 5 wherein the acid moiety of the acrylamido-substituted alkanoic acid is a branched chain acid.

8. Polymers of claim 1 wherein the alkanoic acid moiety of the acrylamido-substituted alkanoic acid is a 3-dialkyl-substituted alkanoic acid, said substituted acid having at least 5 carbon atoms.

9. Polymer of claim 8 wherein the acrylamido-substituted alkanoic acid is 3-acrylamido-3-methylbutanoic acid.

10. Polymers of claim 1 wherein the acrylamido moiety of the acrylamido-substituted alkanoic acid is a 2-lower alkyl-substituted acrylamido moiety.

11. Polymers of any of claims 3 to 10 wherein the alkanoic acid is in its alkali metal salt form.

12. Polymers of claim 1 wherein the monomers comprise from about 30 to 97 mole percent acrylamide, and about 3 to 70 mole percent alkali metal 3-acrylamido-3-methylbutanoate.

13. Polymers of claim 12 wherein the monomers comprise from about 50 to 95 mole percent acrylamide and about 5 to 50 mole percent alkali metal 3-acrylamido-3-methylbutanoate.

14. Polymers of claim 12 wherein the monomers comprise from about 85-95 mole percent acrylamide, and about 5-15 percent alkali metal 3-acrylamido-3-methylbutanoate.

15. Polymers of claim 1 wherein the olefinically unsaturated monomer comprises acrylic acid.

16. Polymers of claim 1 wherein the olefinically unsaturated monomer comprises an alkali metal acrylate.

17. Polymers of claim 1 wherein the monomers comprise from about 30 to 97 mole percent acrylamide, and about 3 to 70 mole percent alkali metal 3-methacrylamido-3-methylbutanoate.

18. In a process for recovering petroleum from a subterranean oil-bearing formation wherein an aqueous solution containing a water-soluble, viscosity-controlling polymer, is introduced into said formation through an input well, thereby causing said petroleum to flow a distance for collection at at least one output well, the improvement which comprises employing as said viscosity-controlling polymer a minor but effective amount of a water-soluble, random polymer which contains moieties which comprise, by mole percent:
    (a) from about 1 to 99 percent of acrylamide;
    (b) from about 1 to 99 percent of an alkali metal salt of an acrylamido-substituted alkanoic acid; and
    (c) from 0 to about 30 percent of one or more copolymerizable olefinically unsaturated monomers having at least one polymerizable ethylenic double bond,
in which the polymer has an average molecular weight greater than about 50,000.

19. Process of claim 18 wherein the average molecular weight of the polymer is from about 1,000,000 to 20,000,000.

20. Process of claim 18 wherein the alkanoic acid moiety of the acrylamido-substituted alkanoic acid has from about 3 to 8 carbon atoms.

21. Process of claim 18 wherein the alkanoic acid moiety of the acrylamido-substituted alkanoic acid has from about 4 to 7 carbon atoms.

22. Process of claim 18 wherein the alkanoic acid moiety of the acrylamido-substituted alkanoic acid has 5 or 6 carbon atoms.

23. Process of any of claims 18 to 22 wherein the acid moiety of the acrylamido-substituted alkanoic acid is a straight chain acid.

24. Process of any of claims 18 to 23 wherein the acid moiety of the acrylamido-substituted alkanoic acid is a branched chain acid.

25. Process of claim 18 wherein the alkanoic acid moiety of the acrylamido-substituted alkanoic acid is a 3-dialkyl-substituted alkanoic acid, said substituted acid having at least 5 carbon atoms.

26. Process of claim 25 wherein the acrylamido-substituted alkanoic acid is 3-acrylamido-3-methylbutanoic acid.

27. Process of claim 18 wherein the acrylamido moiety of the acrylamido-substituted alkanoic acid is a 2-lower alkyl-substituted acrylamido moiety.

28. Process of any of claims 20 to 27 wherein the alkanoic acid is in its alkali metal salt form.

29. Process of claim 18 wherein the polymer comprises from about 30 to 97 mole percent acrylamide, and about 3 to 70 mole percent alkali metal 3-acrylamido-3-methylbutanoate.

30. Process of claim 29 wherein the polymer comprises from about 50 to 95 mole percent acrylamide, and about 5 to 50 mole percent alkali metal 3-acrylamido-3-methylbutanoate.

31. Process of claim 28 wherein the polymer comprises from about 85 to 95 mole percent acrylamide, and about 5–15 percent alkali metal 3-acrylamido-3-methylbutanoate.

32. Process of claim 18 wherein the polymer contains up to about 30 mole percent of acrylic acid and 5–15 percent alkali metal 3-acrylamido-3-methylbutanoate.

33. Process of claim 18 wherein the polymer contains up to about 30 mole percent of an alkali metal acrylate, and 5–15 percent alkali metal 3-acrylamido-3-methylbutanoate.

34. Process of claim 18 wherein the polymer is employed in an aqueous medium in concentrations of from about 500 to 2000 ppm by weight based on the weight of the aqueous medium.

35. Process of claim 18 wherein the polymer comprises from about 30 to 97 mole percent acrylamide, and about 3 to 70 mole percent alkali metal 3-methacrylamido-3-methylbutanoate.

* * * * *